United States Patent [19]
DeBell et al.

[11] Patent Number: 4,809,293
[45] Date of Patent: * Feb. 28, 1989

[54] OPTICAL COMPONENT OF A LASER

[75] Inventors: Gary W. DeBell, Los Altos; David L. Wright, Redwood City; Kenneth A. Ruddock, Oak Creek; Alan B. Petersen, Palo Alto; Lee R. Carlson, Pleasanton; Marc K. Von Gunten, Los Altos, all of Calif.

[73] Assignee: Spectra-Physics, Inc., San Jose, Calif.

[*] Notice: The portion of the term of this patent subsequent to Aug. 4, 2004 has been disclaimed.

[21] Appl. No.: 58,498

[22] Filed: Jun. 5, 1987

Related U.S. Application Data

[63] Continuation-in-part of Ser. No. 770,717, Sep. 3, 1985, Pat. No. 4,685,110, which is a continuation-in-part of Ser. No. 654,305, Sep. 24, 1984, abandoned.

[51] Int. Cl.$^4$ ............................................... H01S 3/08
[52] U.S. Cl. .......................................... 372/98; 372/99; 372/101; 372/103; 372/106
[58] Field of Search ................... 372/98, 99, 101, 103, 372/106

[56] References Cited

U.S. PATENT DOCUMENTS 4,685,110 8/1987 DeBell et al. ...................... 372/103

Primary Examiner—William L. Sikes
Assistant Examiner—Robert E. Wise
Attorney, Agent, or Firm—Paul Davis

[57] ABSTRACT

An optical component of a laser, of the type including a hot gas plasma region, a cold gas region, and producing large photon fluxes, includes an optical element and a coating means on a surface of the optical element exposed to the photon fluxes. The coating means is comprised of a material adapted to minimize photoreduction of the optical element induced by exposure to the photon fluxes. Optical elements of the present invention include windows, birefringent plates, intracavity lenses, polarizers and mirrors. The coating means includes a material selected from the group comprising $Al_2O_3$, $BeO$, $Y_2O_3$, $MgO$, $B_2O_3$, $Sc_2O_3$, $LiF$, $NdF_3$, $ThF_4$, $Na_3AlF_6$, and mixtures thereof.

25 Claims, 2 Drawing Sheets

FIG. I

OPTICAL COMPONENT OF A LASER

This is a continuation-in-part application of co-pending U.S. patent application Ser. No. 770,717, filed Sept. 3, 1985 (incorporated herein by this reference), assigned to the same assignee, which is a continuation-in-part application of U.S. patent application Ser. No. 654,305, filed Sept. 24, 1984, assigned to the same assignee and now abandoned.

BACKGROUND OF THE INVENTION

This invention relates generally to optical components of a laser, and more particularly, to optical components, such as windows, which are exposed to large photon fluxes and may suffer photoreduction as a result of exposure to the fluxes.

In almost all gas ion lasers there is a decrease in useful laser power output over the operating life of the laser. This decrease in useful power is accentuated by losses at optical elements, for example, window (or windows) of the laser tube.

With lasers that operate at high gain (such as lasers which laser at some visible light frequencies) losses from optical elements, especially windows, while undesirable, can often be tolerated during the operating lifetime of the tube. However, even with such high gain lasers, eliminating or minimizing such losses is desirable. Eliminating or minimizing optical element (window) losses can extend the useful life of the tube and provide more efficient and, precise operation of the tube.

With lasers that lase at relatively low gain (such as a laser lasing at certain ultraviolet frequencies) a decrease in useful power, accentuated by losses at, for example, a window, can become very significant.

The plasma arc generated in the tubes of gas ion lasers can produce large photon fluxes which are capable of initiating physical and chemical changes on an optical element's surface exposed to the fluxes. More particularly, these photon fluxes are capable of producing photoreduction of the exposed optical element surfaces.

Exemplary materials used for optical elements in such lasers include but are not limited to crystalline $SiO_2$, Si, fused $SiO_2$, sapphire, diamond, BeO, $MgF_2$, ZnS, ZnSe, $BaF_2$, $CaF_2$, diamond-like carbon, yttrium aluminum garnet (YAG), yttrium lithium fluoride (YLF), mixtures thereof, and the like. These materials often experience physical and chemical changes, particularly photoreduction, on surfaces exposed to photon fluxes. In the case of windows mounted at the end of a laser tube, this occurs on the inside surface of the window. Other optical elements positioned within the interior of the tube are also subject to photoreduction.

It would be an advancement in the art to provide laser optical components which would not undergo photoreduction when exposed to these photon fluxes, particularly when the laser is one which generates ultraviolet radiation during operation. Such lasers produce ultraviolet radiation either incidental to or as a part of the beam. These include noble gas ion lasers, excimer lasers, $CO_2$ lasers, free electron lasers, atomic metal vapor lasers, and the like.

SUMMARY OF THE INVENTION

Accordingly, it is an object of the present invention to provide laser optical components which do not undergo photoreduction when exposed to large photon fluxes generated in a laser.

Another object of the present invention is to minimize photoreduction changes on the inner surface of a window mounted at the end of a laser tube during operation of the laser.

Yet another object of the present invention is to minimize other physical and chemical changes induced on surfaces of laser optical elements induced by photon fluxes.

Still another object of the present invention is to minimize photon flux induced photoreduction of optical components which are associated with the cold gas region of a gas ion laser.

A related object of the present invention is to substantially increase the useful life of laser tubes by minimizing physical and chemical changes, such as photoreduction, on optical elements caused by photon fluxes.

Another object of the present invention is to enhance the radiation resistance of optical elements associated with the cold gas region of a gas ion laser.

The present invention is an optical component of a laser. Photon fluxes are produced during operation of the laser. An optical element is included which has at least one surface exposed to and in communication with the photon fluxes. The coating means is on the optical element surface exposed to the photon fluxes. The coating means is formed of a material adapted to minimize photon flux induced photoreduction of the optical element.

In another aspect of the present invention, an optical element operatively associated with a laser, which transmits photon fluxes, includes an optical element having at least one surface exposed to the photon fluxes. A coating is disposed on the exposed surface. The coating's stoichiometry is not substantially changed when exposed to the photon fluxes.

In a further aspect of the present invention, a window construction is mounted at the end of a laser tube of the type in which large photon fluxes are generated during laser operation. These photon fluxes are capable of initiating physical and chemical changes on window surfaces exposed to the fluxes. The window construction includes window means made of a transparent optical material for transmitting a laser light beam through the window means. Also included are radiation resistant and optically transparent coating means on the inner surface of the window means exposed to the photon fluxes. The coating means prevents or minimizes physical and chemical changes on the surface which can occur during operation of the laser.

Advantageously, the present invention is applicable to optical elements associated with the cold gas region of a laser which generates ultraviolet radiation during laser operation. Exemplary lasers include noble gas ion lasers, excimer lasers, $CO_2$ lasers, free electron lasers, atomic vapor lasers, and the like. The present invention provides a coating for optical element surfaces exposed to these photon fluxes which increases the laser lifetime. The resulting laser is more cost effective and has greater efficiency. The coating is selected to particularly minimize photoreduction of effects caused by exposure to photon fluxes.

As will be appreciated, the present invention is not limited to windows. Other laser optical elements, such as intracavity lenses, mirrors, birefringent plates, polarization elements, and the like, can also be coated.

The coating provides a number of useful functions. It minimizes photoreduction at surfaces exposed to the photon fluxes; enhances the radiation hardness of the optical element; and minimizes optical degradation, which can result from either absorption of light radiation or phase front distortion of the exposed surface.

In one specific embodiment of the present invention, the optical element is a window, and more particularly, a Brewster-angle window. The window is part of a laser which lases in the ultraviolet frequency range and produces a relatively low gain. In this specific embodiment, the window material is crystalline $SiO_2$, and the coating is an oxide such as $Al_2O_3$, or mixtures of various oxides. Further in this specific embodiment, the coating is a thin layer of about 100 angstroms in thickness.

Optical components and coating methods, as described above, comprise further specific objects of the present invention.

Other and further objects of the present invention will be apparent in the following description and claims and are illustrated in the accompanying drawings, which, by way of illustration, show preferred embodiments of the present invention and the principles thereof, and what are now considered to be the best modes contemplated for applying these principles. Other embodiments of the invention, embodying the same or equivalent principles may be used, and structural changes may be made as desired by those skilled in the art without departing from the present invention and the purview of the appendant claims.

BRIEF DESCRIPTION OF THE DRAWINGS

FIG. 1 is partially broken away and in cross-section to show certain components of the laser tube.

DESCRIPTION OF THE PREFERRED EMBODIMENTS

Figure 1:
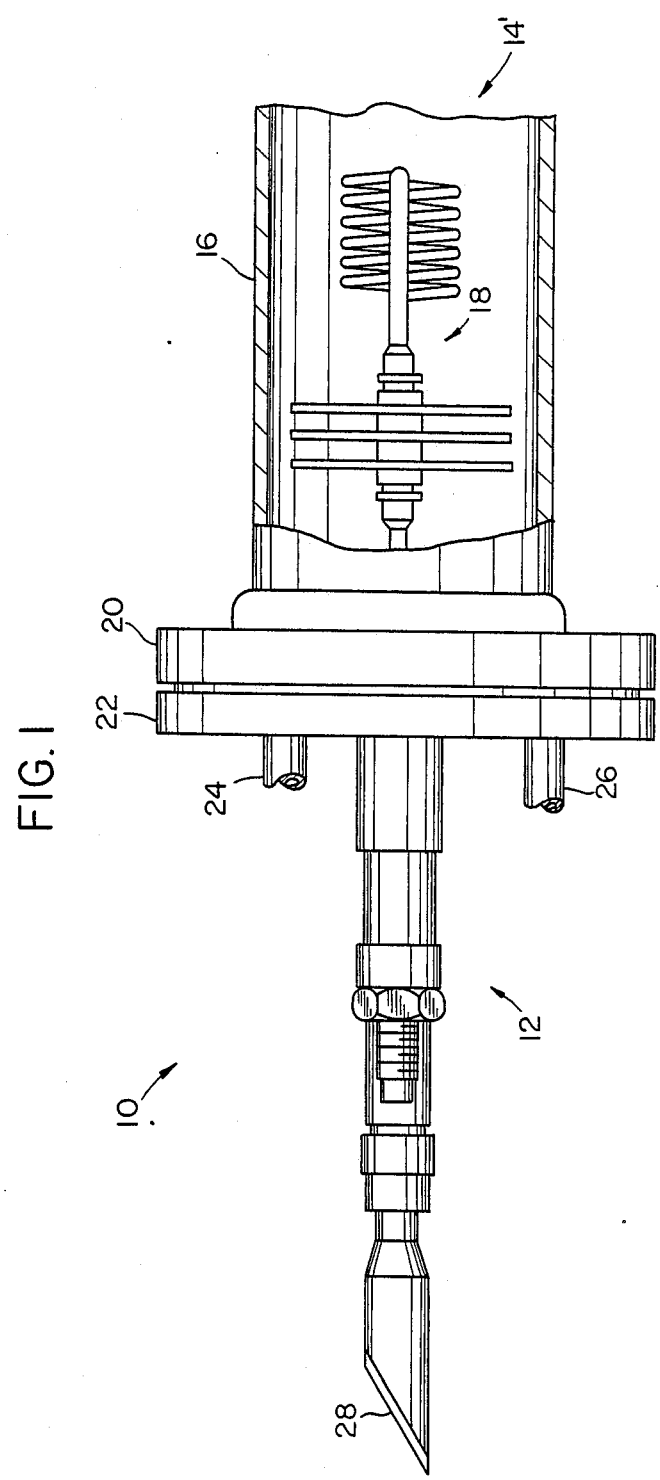
FIG. 1 is a side elevational view of one end of a laser tube of the kind in which the present invention may be employed. As illustrated, a specific optical element, a window sealably mounted at the end of a laser tube, is shown.

In FIG. 1, a laser tube is indicated generally by the reference numeral 10.

The laser tube 10, as illustrated in FIG. 1 is a laser tube for a gas ion laser, and only one end of the tube is shown.

Laser tube 10 is essentially in two sections: a cold gas section denoted as 12, and a hot gas plasma section illustrated as 14. The present invention is utilized with a laser of the type in which ultraviolet radiation is generated ether as part of the laser beam itself, or as incidental radiation.

Hot gas is substantially found in plasma section 10, where a population inversion resulting in lasing action produces a laser beam of a selected wavelength. This hot gas is essentially not found in cold gas section 14.

Although FIG. 1 illustrates an ion laser, it will be appreciated that the present invention is also suitable for other lasers in which high photon fluxes are generated. The present invention is suitable with the following types of lasers: noble gas ion; excimer; $CO_2$; free electron; atomic metal vapor; and the like. Additionally, the present invention can be employed with lasers having varied geometries such as ring and folded lasers. It is not limited to optical elements positioned within or in communication with the cold gas region of an ion laser.

Tube 10 includes a cylindrical member 16, and a cathode assembly 18. The hot plasma remains within cylindrical member 16, between cathode assembly 18 and an anode (not shown).

In the construction illustrated, end flanges 20 and 22 provide a mounting arrangement for mounting a tube end assembly (cold gas section 12) onto the cylindrical member 16.

Flange 22 may include one or more connector assemblies, 24 and 26, for connecting auxiliary equipment to tube 10. This includes vacuum pump means, filling equipment units, and the like.

As illustrated in FIG. 1, an optical element in the form of a window 28 is mounted at the end of cold gas section 12 of tube 10. Although FIG. 1 illustrates a window, the present invention is useful with other optical elements, including but not limited to, intracavity lenses, mirrors, birefringent plates, polarizing plates other polarizers, and the like.

In the specific embodiment illustrated in FIG. 1, window 28 is mounted at a Brewster angle. However, the present invention is not limited to windows or other optical elements which are mounted at a Brewster angle. Windows as well as other optical elements can be mounted at other angles.

Laser tube 10 has another electrode, an anode, at the end of the tube (not shown) in FIG. 1. A plasma arc is generated between cathode 18 and the anode. The plasma arc can produce large photon fluxes during operation of the laser. These photon fluxes can be instrumental in causing a decrease in useful power output of the laser tube due to losses at optical components which include, but are not limited to, windows of the tube. As defined herein, a large photon flux is cumulative depending on photon energy, flux density and exposure duration. A range of about $10^{10}$ to $10^{20}$ photons per second can be considered large in view of the preceding factors, as well as the particular application.

Figure 2:
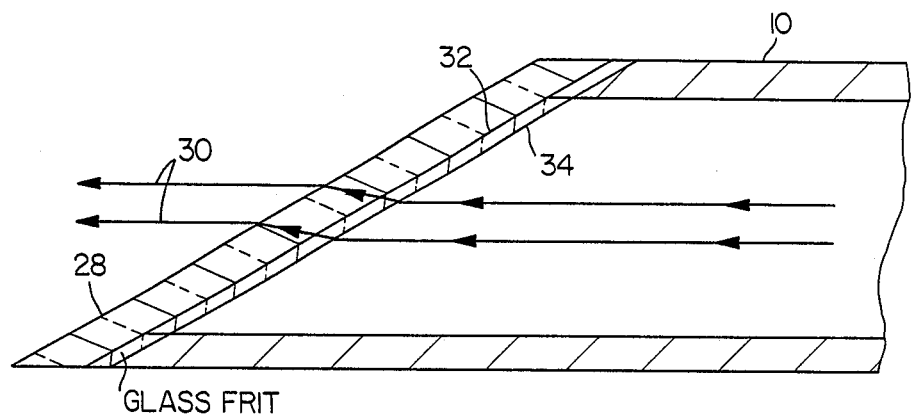
FIG. 2 is an enlarged view showing greater details of the window construction used in the laser tube illustrated in FIG. 1.

The laser beam, which is produced by laser tube 10, is indicated by the reference numeral 30 in FIG. 2.

In one embodiment, window 28 is mounted to tube 10 by a glass frit procedure in which a glass frit is disposed intermediate tube 10 and window 28. The actual mounting process is a conventional frit process sealed at high temperatures. Other mounting procedures are suitable, including utilization of epoxy or cement, optical contacting, fusing, use of deformable gaskets, and the like. In another embodiment of the present invention, the window is mounted without a frit. A full description of this procedure is set forth in U.S. application Ser. No. 876,559, filed June 20, 1986, assigned to the same assignee as this application, and fully incorporated herein by this reference.

Any loss in transmitting beam 30 through window 28 results in a loss in the useful power output of the laser.

Losses can occur at optical elements, including window 28, as a result of optical degradation. Damage to optical elements can result in absorption of light radiation or phase front distortions.

Optical degradation to optical elements can occur as a result of physical or chemical changes on surfaces of optical elements, such as surface 32 of window 28. This is the surface exposed to the large photon fluxes produced by the plasma arc during laser operation.

The physical and chemical changes induced by the photon fluxes are generally photoreduction of an optical element surface exposed to the fluxes. Throughout the remainder of this disclosure, the physical and chemical induced changes shall be referred to as photoreduction changes. However, it will be appreciated that the present invention is not limited to photoreduction changes. These physical and chemical changes are minimized by applying a radiation resistant and optically transparent coating 34 to an optical element's surface which is exposed to the photon fluxes, particularly in a cold gas region 12 of an ion laser.

Radiation resistant, as used throughout this disclosure, means that coating 34 undergoes substantially no physical or chemical changes when exposed to ultraviolet radiation dosages generated during laser operation. Radiation resistant, as the term is used, is additionally subject to intensity and time parameters. That is, the greater the intensity of the photon flux, in combination with a greater time period of flux exposure, the more radiation resistant the coating must be. In this regard, the term, as applied to the present invention, is subject to the qualification that coating 34 may not be radiation resistant under unusual operating conditions, such as extreme intensity and time parameters.

Coating 34 serves a number of useful functions. It is a material which does not change the optical properties of the optical element to any substantial extent. For example, it is transparent at the wavelength of interest. The refractive index of coating 34 is chosen to minimize reflection losses when the coating is applied, such as, for example, when a window is mounted at Brewster angle.

Coating 34 is disposed on optical element surfaces exposed to large photon fluxes to minimize photoreduction that can occur at the surface. Additionally, coating 34 has a stoichiometry which does not substantially change when exposed to the photon fluxes. It serves to minimize the breakage of bonds at the exposed surface. Further, coating 34 does not itself substantially absorb the desired wavelength after or during exposure to ultraviolet radiation. Stoichiometry, as defined herein, includes the conservation of matter and energy to chemical activity.

Suitable optical element materials include but are not limited to crystalline $SiO_2$, Si, fused $SiO_2$, sapphire, diamond, BeO, $MgF_2$, ZnS, ZnSe, $BaF_2$, $CaF_2$, diamond-like carbon, yttrium aluminum garnet (YAG), yttrium lithium fluoride (YLF), mixtures thereof, and the like. The preferred material is crystalline $SiO_2$, suitable coating materials are those which substantially minimize photoreduction of optical element surfaces when disposed on an optical surface to be protected. These materials have low reflectivity, low optical absorption in the region where the laser operates, and have low scatter in the wavelength region where the laser operates. Preferred materials include oxides, fluorides, mixtures thereof, as well as partial compositions of these materials along with other materials. Exemplary coating materials include but are not limited to $Al_2O_3$, BeO, $Y_2O_3$, MgO, $B_2O_3$, $Sc_2O_3$, LaF, $NdF_3$, $ThF_4$, $MgF_2$, $Na_3AlF_6$, mixtures thereof, as well as mixtures of these materials with other compounds. The most preferred materials are $Al_2O_3$ and BeO. Coating 34 is made primarily of one of these compounds (at least 75%) but can also include other compounds which enhance its effectiveness to minimize photon reduction. Additionally, other compounds may be included, as impurities.

Significantly, coating 34 can be comprised of one layer or more such as a multilayer design. Coating 34 can comprise a layer of a first chosen material, a second layer of a second chosen material and so forth. When a multilayer structure is employed, it is configured to satisfy minimum reflection losses of the combination of coated surface 32 and coating 34.

Additionally, as previously recited, coating 34 may be comprised of mixtures of one or more of the exemplary compounds, applied in single or multiple layers.

The materials selected for coating 34, and the coated surface 32, are chosen to reduce absorption of contaminants on surface 32, which but for coating 34 would be subjected to photoreduction from exposure to photon fluxes.

The thickness of coating 34 can vary. It can be a thin film with a thickness above about 50 angstroms. It can be applied in a half-wave optical thickness (absentee layer) or as integral multiples of the half-wave optical thickness.

Coating 34 i applied to optical elements by various means. In one embodiment, it is applied to the desired surface by physical vapor deposition using any variety of applicators, including but not limited to an electron beam gun, sputtering, and the like. In another embodiment, it is applied by chemical deposition such as by emersion in a chemical bath.

Figure 3:
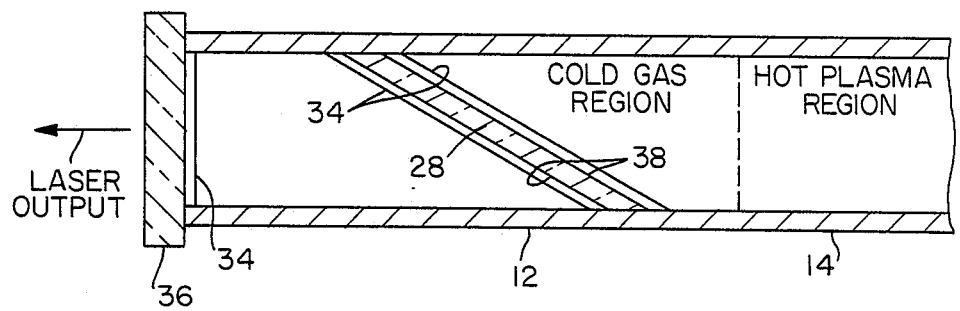
FIG. 3 is a block diagram of a cold gas region of an ion laser. Illustrated is a mirror sealably mounted at the end of a laser tube, and a second optical element positioned within the interior of the cold gas region of the tube. The elements illustrated are not drawn to scale.

With reference now to FIG. 3 there is illustrated an optical element 28 positioned in the interior of laser tube 10, and more particularly in cold gas region 12. Throughout this disclosure, the same reference numbers are used to denote the same or similar elements. In FIG. 3, an optical element 28, such as a polarizing plate, birefringent plate, intracavity lens and the like, is coated on two opposing surfaces with coating 34. Optical element 34 may or may not be at Brewster angle. Both surfaces are coated when they are respectively in communication with photon fluxes in order to minimize photoreduction at each exposed surface.

In another embodiment, only one surface of optical element 28 is coated. Additionally, when both sides are coated, each side can be coated with the same materials, different materials at different thicknesses, and multilayer structures, with differing compositions, as mixtures, on one or both sides.

With further reference to FIG. 3, at the end of tube 10 is a laser output mirror 36. Mirror 36 is mounted to tube 10 by a variety of conventional means including but not limited to frit sealing, as well as the non-frit sealing technique previously disclosed. Surface 38, exposed to the interior of tube 10, is coated with coating 34. It will be appreciated that optical elements such mirror 36 can be comprised of multilayer structures.

The present invention finds application with lasers lasing in the ultraviolet, visible, infrared spectrum, and the like.

In one specific embodiment of the present invention, a window is mounted at a Brewster angle at the end of the cold gas region of a laser tube lasing in the ultraviolet frequency range. In this particular embodiment, the window is made of crystalline $SiO_2$, and the coating material is $Al_2O_3$, or a mixture of $Al_2O_3$ and other suitable coating materials, inert materials, and the like. It is coated to a physical thickness of about 100 angstroms by physical vapor deposition.

A laser lasing in the ultraviolet frequency range operates at low gain, and losses at an optical element, such as a window, can result in the decrease of the useful power of the laser within a short period of time. For example, the large photon flux can cause photoreduction of a surface of crystalline $SiO_2$. This is a reduction of $SiO_2$ to elemental Si along with other reduction products. If elemental Si is present on the surface, it can exhibit optical loss such as absorption, scattering, and the like, at the lasing wavelength. Just a fraction of an atomic layer of elemental Si can absorb a significant amount of the light of a laser beam. A coating such as $Al_2O_3$, BeO, or a coating comprising primarily $Al_2O_3$ along with other components, applied as a thin film or in half-wave optical thickness (or integral multiples thereof) is effective to minimize photoreduction of $SiO_2$.

The coating material utilized is also a radiation hard material in the sense that it does not readily dissociate or change stoichiometry under the exposure to the large photon flux.

While we have illustrated and described the preferred embodiments of our invention, it is to be understood that these are capable of various modifications. We therefore do not wish to be limited to the precise details set forth, but desire to avail ourselves of such changes and alterations as fall within the purview of the following claims.

We claim:

1. An optical component of a laser of the type with photon fluxes generated within the laser, comprising:
   an optical element operatively associated with said laser having at least one surface exposed to and in communication with said photon fluxes; and
   a coating means on said optical element surface exposed to said photon fluxes, said coating means being formed of a material including a member of the group selected from $Al_2O_3$, BeO, $Y_2O_3$, MgO, $B_2O_3$, $Sc_2O_3$ hafnium oxide, titanium oxide, LiF, $NdF_3$, $ThF_4$, $Na_3AlF_6$, and mixtures thereof.

2. The optical component of claim 1, wherein said optical element has more than one surface exposed to said photon fluxes.

3. The optical component of claim 2, wherein each surface of said optical element exposed to said photon fluxes is coated with said coating means.

4. The optical component of claim 1, wherein said coating means is an optically thin film.

5. The optical component of claim 1, wherein said coating means has a physical thickness greater than about 50 angstroms.

6. The optical component of claim 1, wherein said coating means has a physical thickness of about 100 angstroms.

7. The optical component of claim 1, wherein said coating means is applied to each optical element exposed surface at substantially a half-wave optical thickness or an integral number of half-wave optical thicknesses.

8. The optical component of claim wherein said coating means is a multilayer film with each layer being made of a different material.

9. The optical component of claim wherein said optical element is a window on the end of a laser tube defining a cold gas region of an ion laser.

10. The optical component of claim 9, wherein said window is frit-sealed to said laser tube.

11. The optical component of claim 9, wherein said window is a Brewster-angle window.

12. The optical component of claim 1, wherein said optical element is positioned in an interior of a cold gas region of an ion laser and has two opposing surfaces with at least one surface exposed to said photon fluxes, and said exposed surface having a coating means supplied thereto.

13. The optical component of claim 1, wherein said optical element is an intracavity lens.

14. The optical component of claim 1, wherein said optical element is a birefringent plate.

15. The optical component of claim 1, wherein said optical element is a polarizer.

16. The optical component of claim wherein said optical element is a mirror.

17. The optical component of claim wherein said optical element is made of a material which includes a material selected from crystalline $SiO_2$, Si, fused $SiO_2$, sapphire, diamond, BeO, $MgF_2$, ZnS, ZnSe, $BaF_2$, $CaF_2$, yttrium aluminum garnet (YAG), yttrium lithium fluoride (YLF), and mixtures thereof.

18. The optical component according to claim 1, wherein said coating means includes an oxide.

19. The optical component according to claim 1, wherein said coating means is a material which has low reflectivity, low optical absorption and low scatter in the spectrum where said laser operates.

20. The optical component according to claim 1, wherein said coating means is adapted to minimize changes or alterations to optical phase fronts occurring after exposure to said photon fluxes.

21. The optical component of claim 1, wherein said optical element and coating means are selected to reduce the absorption of contaminants of an optical element surface which is coating with said coating means.

22. The optical component of claim 1, wherein said coating means is made of a material including $Al_2O_3$ or BeO.

23. The optical component of claim 1, wherein said coating means is made of $Al_2O_3$.

24. An optical component operatively associated with a laser generating photon fluxes, comprising:
   an optical element mounted to said laser and having at least one surface exposed to said photon fluxes; and
   a coating deposited on said exposed surface, said coating layer being made of a material having a stoichiometry which does not substantially change when exposed to said photon fluxes and including a material selected from the group comprising $Al_2O_3$, BeO, $Y_2O_3$, MgO, $B_2O_3$, $Sc_2O_3$ hafnium oxide, titanium oxide, LiF, $NdF_3$, $ThF_4$, $Na_3AlF_6$, and the like.

25. A window construction for mounting at an end of a laser of the kind in which large photon fluxes are generated during operation of the laser, which photon fluxes are capable of initiating physical and chemical changes on a window surface exposed to such large photon fluxes, said window construction comprising:
   window means of transparent optical material for transmitting a laser light beam through the window means; and
   radiation resistant and optically transparent coating means on the inner surface of the window means exposed to the large photon fluxes for preventing or minimizing physical and chemical changes on said surface during operation of the laser, said coating means including a material selected from the group $Al_2O_3$, BeO, $Y_2O_3$, MgO, $B_2O_3$, $Sc_2O_3$ hafnium oxide, titanium oxide, LiF, $NdF_3$, $ThF_4$, $Na_3AlF_6$, and mixtures thereof.

* * * * *